Jan. 28, 1958      G. A. MORTON      2,821,643
LIGHT SENSITIVE STORAGE TUBE AND SYSTEM
Original Filed May 3, 1951
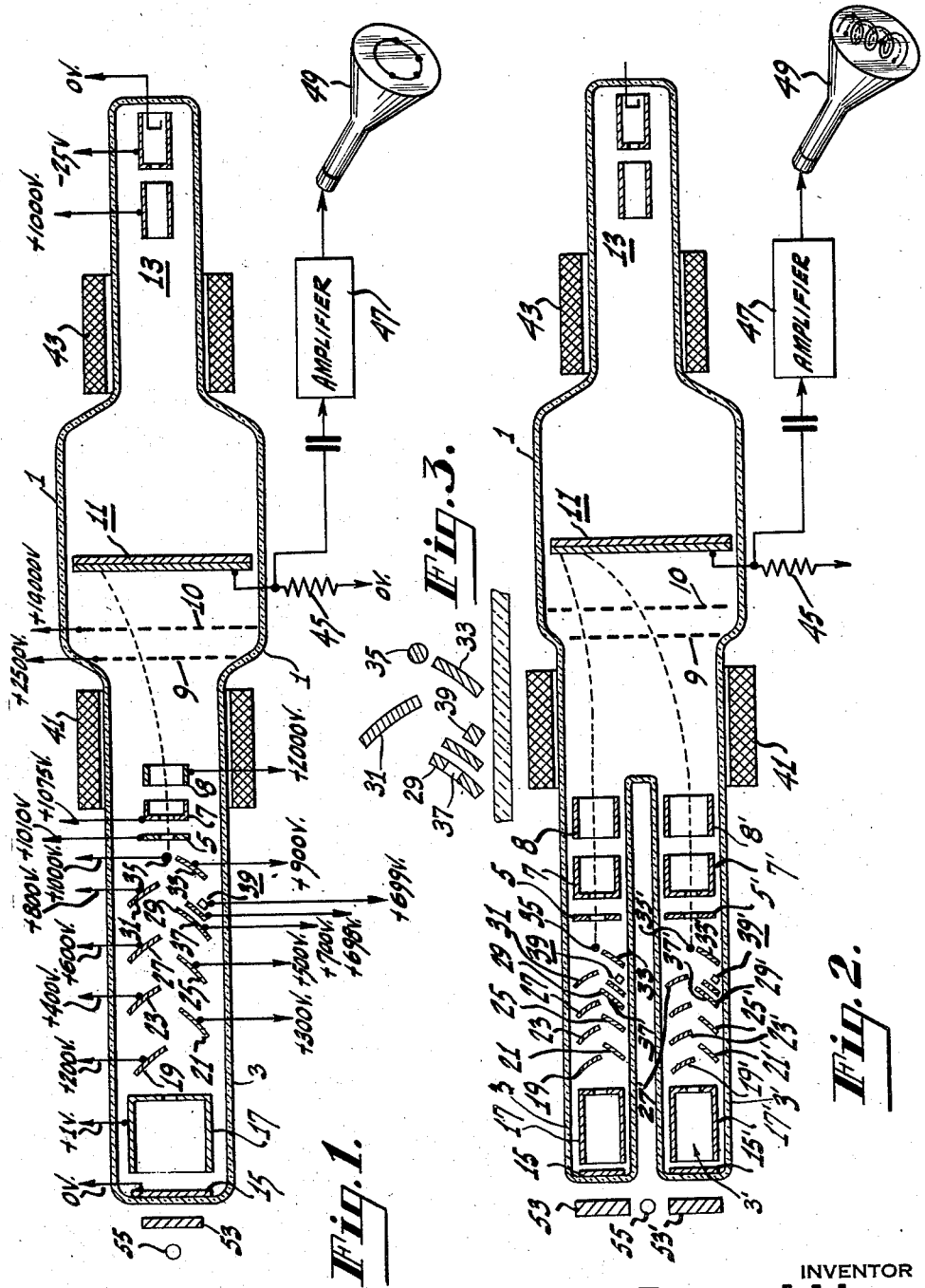
INVENTOR
GEORGE A. MORTON
BY *J. C. Whittaker*
ATTORNEY

United States Patent Office 2,821,643
Patented Jan. 28, 1958

2,821,643

LIGHT SENSITIVE STORAGE TUBE AND SYSTEM

George A. Morton, Princeton, N. J., assignor, by mesne assignments, to the United States of America as represented by the Secretary of the Navy Continuation of application Serial No. 224,302, May 3, 1951. This application June 21, 1954, Serial No. 438,211

5 Claims. (Cl. 313—67)

This application is a continuation of my original application Serial No. 224,302 (now abandoned), filed May 3, 1951, assigned to the same assignee as the instant application.

The invention relates generally to time measurements and more particularly to means for recording and observing the time-relationship between different light impulses or between scintillations of light produced in response to nuclear radiations or other phenomena.

It is the principal object of the present invention to observe and measure the time relationship between light producing phenomena.

Another object of the invention is to provide visual display means for viewing and interpreting the time-relationship between certain light producing phenomena.

A further object of the invention is to provide a system for measuring the time-relationship between a plurality of nuclear or other events.

Another object is to provide a novel electrical storage tube having a photo-emissive cathode.

According to a typical embodiment of the instant invention, a phosphor crystal produces scintillations of light in response to bombardment by nuclear particles. The crystal is disposed next adjacent a novel electrical storage tube which includes therein a photomultiplier device sensitive to these light scintillations. Groups of electrons are emitted by the photomultiplier photocathode in response to each scintillation, are amplified in successive dynode stages of the multiplier, and are stored in a predetermined pattern upon a storage electrode. The data thus stored may be read therefrom by a scanning beam and then be visually displayed and evaluated by means of a television type kinescope, facsimile, or other means.

An auxiliary electron gun preferably is provided within the storage tube for storing a marker charge upon the storage electrode. This gun produces an electron marker beam which is injected into one of the advanced stages of amplification of the photomultiplier. The marker beam is amplified in the remaining multiplier stages and charges the storage electrode in the above-mentioned predetermined pattern. The intensity of the auxiliary marker beam is adjusted such that the visual display device monitoring the storage tube displays a faint marker trace described through the indications corresponding to the nuclear occurrences. The predetermined sweep pattern is described by suitably combining known wave signal frequencies for the writing beam deflection. The time-relationship between certain ones of these sequential nuclear occurrences is then determinable since the sweep pattern thus produced affords a convenient time axis for measuring these events.

A second embodiment, according to the invention, provides means for recording and observing two sets of nuclear events. For example, a radioactive material may, as a result of emission of beta particles, produce radioactive isomers which have extremely short half lives wherein gamma particles are later produced. To record and observe the time-relationship of these two sets of events, different photoelectric channels are provided through which the groups of electrons, corresponding to the different nuclear events, are detected and amplified. The storage electrode charges derived from these separate nuclear date channels are slightly displaced from each other so that the subsequent visual display of these events may be interpreted. Separate auxiliary electron marker guns are also provided for producing a reference trace through the respective visual indications corresponding to each set of events.

The invention will be described in greater detail with reference to the accompanying drawing of which Figure 1 is a schematic circuit diagram of a novel system and electrical storage tube, according to the invention, for determining the time-relationship between certain nuclear phenomena; Figure 2 is a schematic circuit diagram of a novel system and electrical storage tube, according to the invention, for determining the time-relationships between two sets of nuclear phenomena; and Figure 3 is an enlarged view of an auxiliary electron gun.

Like reference characters are applied to like elements throughout the drawing.

Referring to Figure 1 of the drawing, there is disclosed an electrical storage tube having an evacuated envelope 1 which contains a photomultiplier 3, a plurality of control and accelerating electrodes 5, 7, 8, 9, and 10 disposed from the photomultiplier in the order named, a storage electrode 11, and an electron gun 13 for scanning the storage electrode 11 and reading information stored thereon. The storage electrode 11, when reading and writing upon opposite sides thereof, may be substantially as shown and described in a copending application Serial No. 29,746, filed May 28, 1948, by Louis Pensak and entitled Storage Tube, now abandoned. The photomultiplier 3 includes a photocathode 15, a photoelectron collector electrode 17, and a plurality of secondary emissive dynodes 19, 21, 23, 25, 27, 29, 31, 33, and 35 disposed from the collector electrode 17 in the above-listed order.

Assume that the system is in operation and that the horizontal and vertical deflection coils 41 disposed about the storage tube on the writing side of the storage electrode are supplied with a pair of ten megacycle excitation currents differing in phase with respect to each other by ninety degrees.

To measure the time-relationship of certain nuclear occurrences, a phosphor crystal 53 (such as cooled trans-stilbene) is placed next adjacent the storage tube photocathode 15 and is interposed between the photocathode and a nuclear energy source 55. When the source 55 emits a nuclear particle which strikes the trans-stilbene crystal 53 a scintillation of light (having a resolution on the order of $5 \times 10^{-9}$ seconds) is produced which causes the photocathode 15 to emit a group of electrons. The electron group thus emitted is amplified in each successive dynode stage of the photomultiplier 3, is accelerated and focused by the plurality of control electrodes 5, 7, 8, 9, and 10 and finally stored on the storage electrode 11. At some later time a second charge corresponding to a second nuclear particle emission may also be amplified, accelerated, focused, and stored on the electrode 11.

The reading electron gun 13 produces an electron beam which is deflected by suitable television type scanning wave signals applied to the reading gun deflection coils 43. The reading beam scans the previously stored information and develops related television video signals across a suitable load impedance 45. The signals are then amplified in an amplifier 47 and applied to the signal circuits of a television kinescope 49 for viewing.

An auxiliary electron gun 39 is mounted next adjacent one of the photomultiplier dynodes, say 29. The electron beam produced by the gun 39 is injected into the photomultiplier device 3 through a small aperture 37 (having a diameter on the order of a few millimeters) in the selected dynode 29. The beam is amplified by the next succeeding dynode 31 which deflects secondary electrons therefrom to a focusing dynode 33 wherein the amplified auxiliary, or marker, beam is focused on a final secondary emissive dynode 35. The electron output from this final dynode 35 is formed into a beam, is controlled and accelerated by the plurality of control electrodes 5, 7, 8, 9, and 10 to the storage electrode 11 whereon the charge is stored, the pattern of which describes a circle. The marker charge, as may be seen by viewing the kinescope 49, provides a time reference axis for interpreting the nuclear occurrences. Since the deflection wave signal frequencies are ten megacycles, the period of one sweep trace is $10^{-7}$ seconds, hence it is possible to measure the time-relationship of these phenomena. If it is desirable to examine phenomena over a period greater than $10^{-7}$ seconds a plurality of sweep trace circles may be described, each having a predetermined displacement from the others.

Referring to Figure 2, a second embodiment, according to the invention, provides means for separately recording and observing two sets of nuclear events such as the beforementioned production of short life radioactive isomers. The electrical storage tube herein utilized, in addition to the structure disclosed with reference to Figure 1, includes a second phosphor crystal 53', a second protomultiplier 3', and additional associated control electrodes 5', 7', 8'. The geometry of the two scintillation crystals 53 and 53' is arranged such that, for the cited example, one crystal 53 is bombarded by substantially only beta particles while the second crystal 53 is responsive only to gamma particle emissions. In this way the electron output of one photomultiplier 3 stores a charge on the storage electrode 11 for recording only one set of events. The second photomultiplier electron beam writes information relating to the second set of events upon the same electrode. The deflection pattern of the two electron beams may, in this example, comprise a pair of circles having a constant vertical displacement for recording events over an extended period of time. The two electron beams are slightly displaced from each other so that the charges laid down by each beam are not collinear.

Auxiliary electron guns 39 and 39' are provided for injecting separate electron marker beams into each of the two photomultipliers 3 and 3'. The marker charges subsequently laid down on the common storage electrode 11 afford a reference means for discerning between the two sets of nuclear events.

The electrical storage tubes herein disclosed are not limited to reading and writing on opposite sides of the storage electrode. If desirable a suitable storage electrode may be disposed within either of the tubes so that reading and writing of information may be accomplished on a single side of the electrode.

In the event that low velocity reading beams are utilized in the storage tubes disclosed, an electron multiplier may be used in collecting the video information from the storage electrode 11. The information may then as beforementioned be further amplifier in the amplifier 47 preceding the kinescope display device. The auxiliary marker electron gun output need not be continuous but may be modulated to provide a marker trace as desired, such as a dash line trace.

The typical embodiments of the invention have been described with reference to flashes of light produced in response to nuclear radiation. However, the broad teachings of the invention indicate that the system may be utilized in many ways wherein light rays occur intermittently or are the result of certain phenomena. The second embodiment described may, for example, be used to determine the direction of travel of cosmic rays. If it is undesirable to inject the marker trace beam into the photomultiplier through one of the secondary emissive dynodes, the marker gun may be otherwise disposed to provide the same end result.

What is claimed is:

1. An electrical storage tube comprising an evacuated envelope containing a storage electrode, photomultiplier means for emitting electron beam currents produced in response to the occurrence of certain light producing phenomena to be recorded, control means for controlling the flow of said electron current to said storage electrode, electron gun means adjacent said photomultiplier means for injecting an electron beam into an advanced stage of amplification of said photomultiplier means for producing a predetermined electron charge upon said storage electrode thereby providing a reference axis through said recorded phenomena, and electron beam source means disposed in a spaced relation to said storage electrode for scanning said storage electrode and reading the information stored thereon.

2. An electrical storage tube comprising an evacuated envelope containing a storage electrode, photomultiplier means having a plurality of secondary emissive dynodes for generating and amplifying electron beam currents produced in response to the occurrence of certain light producing phenomena to be recorded, control means for controlling the flow of said electron currents to said storage electrode, electron gun means next adjacent one of said dynodes for generating and impelling an electron beam through an aperture in said dynode for producing a predetermined electron charge upon said storage electrode thereby providing a reference axis through said recorded phenomena, and electron beam source means disposed in a spaced relation to said storage electrode for scanning said storage electrode and reading the information stored thereon.

3. An electrical storage tube as claimed in claim 2 wherein said electron gun means adjacent said apertured dynode comprises a cathode electrode and a plurality of control electrodes including said apertured dynode.

4. An electrical storage tube comprising an evacuated envelope containing a storage electrode, a plurality of photomultiplier means each having a photoemissive cathode and a plurality of secondary emissive dynodes for producing and amplifying electron beam currents in response to the occurrence of different light producing phenomena to be recorded, control means for controlling the flow of said electron currents and separately storing corresponding electron charges on said storage electrode, an electron marker gun adjacent one dynode of each of said photomultipliers for generating and impelling an electron beam through an aperture in said dynode for producing a predetermined electric charge upon said storage electrode thereby providing reference axes through each of said different phenomena, and electron beam source means disposed in a spaced relation to said storage electrode for scanning said storage electrode and reading the information stored thereon.

5. An electrical storage tube comprising, an evacuated envelope containing a plurality of photomultipliers each including a photoemissive cathode and a secondary emission type electron multiplier for producing and amplifying electron beam currents, a storage electrode spaced from said photomultipliers positioned in the path of said beam currents for storing said beam currents as electric charges, an electron gun adjacent each of photomultipliers for injecting an electron beam into an advanced stage of multiplication of each of said electron multipliers thereby providing reference axes through said stored charges, and an electron beam source disposed in a spaced relation to said storage electrode for scanning said electrode to read the information stored thereon.

(References on following page)

References Cited in the file of this patent

UNITED STATES PATENTS

| | | |
|---|---|---|
| 2,181,720 | Barthelemy | Nov. 28, 1939 |
| 2,227,097 | Lubszynski | Dec. 31, 1940 |
| 2,248,977 | Flory | July 15, 1941 |
| 2,254,617 | McGee | Sept. 2, 1941 |
| 2,517,404 | Morton | Aug. 1, 1950 |
| 2,549,072 | Epstein | Apr. 17, 1951 |
| 2,555,424 | Sheldon | June 5, 1951 |
| 2,579,351 | Weimer | Dec. 18, 1951 |
| 2,595,552 | Thomas | May 6, 1952 |
| 2,617,042 | Wouters | Nov. 4, 1952 |
| 2,683,832 | Edwards et al. | July 13, 1954 |